US012719217B2

(12) United States Patent
Asano

(10) Patent No.: US 12,719,217 B2
(45) Date of Patent: Aug. 25, 2026

(54) ELECTRICAL CONNECTOR

(71) Applicant: Sumitomo Electric Industries, Ltd., Osaka (JP)

(72) Inventor: Yasunori Asano, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 349 days.

(21) Appl. No.: 18/605,054

(22) Filed: Mar. 14, 2024

(65) Prior Publication Data

US 2024/0413584 A1 Dec. 12, 2024

(30) Foreign Application Priority Data

Jun. 7, 2023 (JP) ................................ 2023-093903

(51) Int. Cl.
*H01R 13/6471* (2011.01)

(52) U.S. Cl.
CPC ................................ *H01R 13/6471* (2013.01)

(58) Field of Classification Search
CPC ... H01R 13/6471; H01R 13/658; H01R 12/00
USPC .......................................................... 439/625
See application file for complete search history.

(56) References Cited

U.S. PATENT DOCUMENTS 9,276,342 B2 3/2016 Masubuchi et al.
9,653,848 B2 5/2017 Masubuchi et al.
10,205,263 B2 2/2019 Hashimoto
2013/0288513 A1 10/2013 Masubuchi et al.
2016/0156133 A1 6/2016 Masubuchi et al.
2016/0268739 A1* 9/2016 Zerebilov ................ H01R 4/66
2017/0098903 A1 4/2017 Yamamoto et al.
2019/0199039 A1* 6/2019 Wu .................... H01R 13/6585
2019/0267732 A1* 8/2019 Buck ..................... H01R 43/205
2020/0366017 A1* 11/2020 Blackburn ............. H01R 12/79
2022/0368077 A1* 11/2022 Little .................... H01R 13/516
2023/0070890 A1* 3/2023 Shrout ............... H01R 13/6658

FOREIGN PATENT DOCUMENTS

JP 2017-069166 A 4/2017
JP 2018-142553 A 9/2018
WO WO-2022147292 A1 * 7/2022 ......... H01R 13/6593

* cited by examiner

*Primary Examiner* — Tulsidas C Patel
*Assistant Examiner* — Jeffrey Mountain
(74) *Attorney, Agent, or Firm* — Volpe Koenig

(57) ABSTRACT

An electrical connector includes first electric wires, second electric wires, a housing and a ground plate. The first electric wires include first signal lines and first ground lines. The second electric wires include second signal lines and second ground lines. The housing includes first and second holding portions. The ground plate includes a plate main body placed between the first electric wires and the second electric wires. The first holding portion holds each conductor at each tip end portion of the first electric wires, and the second holding portion holds each conductor at each tip end portion of the second electric wires. The ground plate includes a first connector extending toward and connected to each conductor of the first ground lines from the plate main body, and a second connector extending toward and connected to each conductor of the second ground lines from the plate main body.

9 Claims, 6 Drawing Sheets

ELECTRICAL CONNECTOR

CROSS REFERENCE TO RELATED APPLICATIONS

The present application is based upon and claims the benefit of priority from Japanese Patent Application No. 2023-093903, filed on Jun. 7, 2023, the entire contents of which are incorporated herein by reference.

TECHNICAL FIELD

The present disclosure relates to an electrical connector.

BACKGROUND

JP2017-069166A discloses an electrical connector that is connected to a mating electrical connector. This electrical connector includes a plurality of electric wires and a housing holding the plurality of electric wires.

SUMMARY

The present disclosure relates, in one aspect, to an electrical connector. The electrical connector includes a plurality of first electric wires, a plurality of second electric wires, a housing and a ground plate. The plurality of first electric wires include a plurality of first signal lines and a plurality of first ground lines connected to a ground. Each of the plurality of first electric wires extends in a first direction, and the plurality of first ground lines are arranged in a second direction intersecting with the first direction. The plurality of second electric wires includes a plurality of second signal lines and a plurality of second ground lines connected to a ground. Each of the plurality of second electric wires extends in the first direction, and the plurality of second electric wires are arranged in the second direction. The plurality of second electric wires are located in a third direction intersecting with both the first direction and second direction with respect to the plurality of first electric wires. The housing includes a first holding portion that holds each tip end portion of the plurality of first electric wires and a second holding portion that holds each tip end portion of the plurality of second electric wires. The ground plate includes a plate main body placed between the plurality of first electric wires and the plurality of second electric wires. In this electrical connector, the first holding portion holds each conductor at each tip end portion of the plurality of first electric wires, and the second holding portion holds each conductor at each tip end portion of the plurality of second electric wires. The ground plate includes a first connector extending toward and connected to each conductor of the plurality of first ground lines from the plate main body, and a second connector extending toward and connected to each conductor of the plurality of second ground lines from the plate main body.

DETAILED DESCRIPTION

Figure 1:
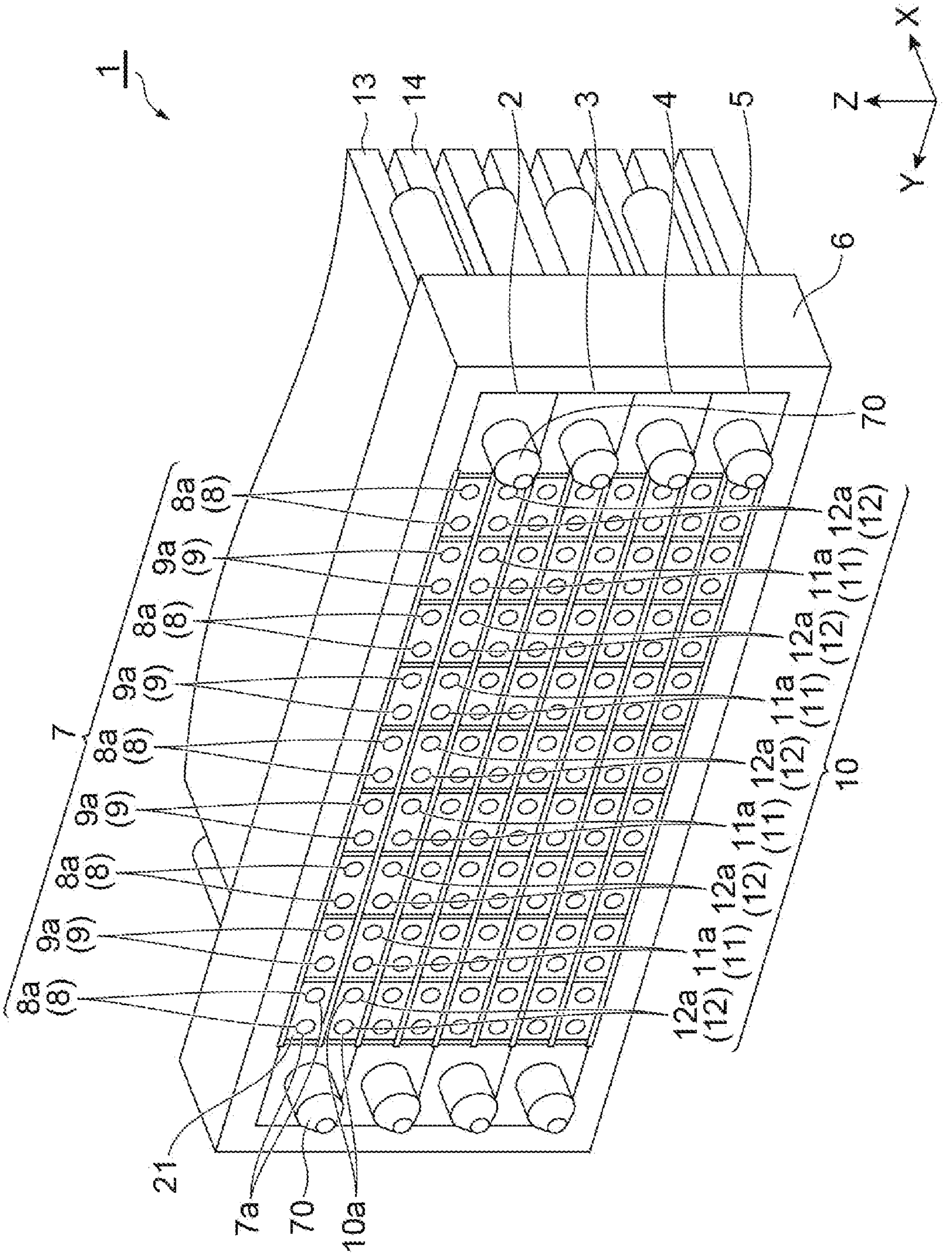
FIG. 1 is a perspective view showing an electrical connector according to an embodiment.

Problems to be Solved by the Present Disclosure

In the electrical connector disclosed in JP2017-069166A, noise is more likely to occur in electric wires as transmission speed of signals increases and signal frequency increases. In order to reduce such noise, it is conceivable to connect conductors of any electric wires of the plurality of electric wires to a ground. It is desired to further reduce such noise for improving transmission characteristics.

Effects of the Present Disclosure

According to the present disclosure, it is possible to improve transmission characteristics in an electrical connector.

Description of Embodiment of the Present Disclosure

First, the contents of embodiments of the present disclosure will be listed and described.

(1) An electrical connector according to an embodiment of the present disclosure includes a plurality of first electric wires, a plurality of second electric wires, a housing and a ground plate. The plurality of first electric wires include a plurality of first signal lines and a plurality of first ground lines connected to a ground. Each of the plurality of first electric wires extends in a first direction, and the plurality of first ground lines are arranged in a second direction intersecting with the first direction. The plurality of second electric wires includes a plurality of second signal lines and a plurality of second ground lines connected to a ground. Each of the plurality of second electric wires extends in the first direction, and the plurality of second electric wires are arranged in the second direction. The plurality of second electric wires are located in a third direction intersecting with both the first direction and second direction with respect to the plurality of first electric wires. The housing includes a first holding portion that holds each tip end portion of the plurality of first electric wires and a second holding portion that holds each tip end portion of the plurality of second electric wires. The ground plate includes a plate main body placed between the plurality of first electric wires and the plurality of second electric wires. In this electrical connector, the first holding portion holds each conductor at each tip end portion of the plurality of first electric wires, and the second holding portion holds each conductor at each tip end portion of the plurality of second electric wires. The ground plate includes a first connector extending toward and connected to each conductor of the plurality of first ground lines from the plate main body, and a second connector extending toward and connected to each conductor of the plurality of second ground lines from the plate main body.

In the above electrical connector, the ground plate is disposed between the plurality of first ground lines and the plurality of second ground lines. This ground plate is connected to each conductor of the plurality of first ground lines and each conductor of the plurality of second ground lines. In this case, the first ground lines and the second ground lines share a ground potential through the ground plate connected to both of the ground lines. As a result, it is possible to reduce the noise generated in the electrical connector and to improve transmission characteristics. Furthermore, in this electrical connector, the ground plate connected to the plurality of first ground lines and the plurality of second ground lines is disposed between the plurality of first electric wires and the plurality of second electric wires and is used as a common ground plate. In this case, the ground plate is shared and thus the electrical connector can be made smaller and thinner. Therefore, according to this electrical connector, in addition to being able to improve the transmission characteristics, it is also possible to make the electrical connector smaller and thinner.

(2) In the electrical connector according to (1) above, the plurality of first ground lines and the plurality of second ground lines may be disposed in a staggered manner in the second direction. In this case, the configuration for connecting the common ground plate to the plurality of first ground lines and the plurality of second ground lines (the first connector and the second connector) can be simplified.

(3) In the electrical connector according to (1) or (2) above, each first signal line of the plurality of first signal lines and each first ground line of the plurality of first ground lines may be disposed in a staggered manner in the second direction. In this case, the arrangement of the signal lines and the ground lines can be simplified. Further, similarly, each second signal line of the plurality of second signal lines and each second ground line of the plurality of second ground lines may be disposed in a staggered manner in the second direction.

(4) In the electrical connector according to any one of (1) to (3) above, in the plurality of first electric wires, each signal line of the plurality of first signal lines and each ground line of the plurality of first ground lines may be disposed to be point symmetrical with respect to a center point in the second direction. Similarly, in the plurality of second electric wires, each signal line of the plurality of second signal lines and each ground line of the plurality of second ground lines may be disposed to be point symmetrical with respect to a center point in the second direction. As a result, it is possible to prevent the plurality of first electric wires and the plurality of second electric wires from being assembled in an incorrect direction when the plurality of first electric wires and the plurality of second electric wires are assembled.

(5) In the electrical connector according to any one of (1) to (4) above, the first connector may include a plurality of first elastic pieces configured to come into elastic contact with each conductor of the plurality of first ground lines. Similarly, the second connector may include a plurality of second elastic pieces configured to come into elastic contact with each conductor of the plurality of second ground lines. In this case, the ground plate can be brought into reliable contact with each first ground line and each second ground line, and stable ground performance can be achieved.

(6) In the electrical connector according to (5) above, the plurality of first elastic pieces and the plurality of second elastic pieces may be formed such that each of the plurality of first elastic pieces and each of the plurality of second elastic pieces protrude in different directions from each other in the third direction. In this case, the ground plate can be brought into reliable contact with each first ground line and each second ground line, and stable ground performance can be achieved.

(7) In the electrical connector according to any one of (1) to (6) above, the ground plate may be provided with a configuration to position at least one of the plurality of first electric wires and the plurality of second electric wires. In this case, it is possible to prevent the ground plate from being assembled in an incorrect direction when the ground plate is assembled. Such a positioning configuration is preferably provided in the ground plate in a case where the signal lines and the ground lines of the electric wires are not disposed to be point symmetrical with respect to a center in the second direction (in the case of an asymmetric arrangement). However, it may be provided in the case of point symmetry.

(8) In the electrical connector according to any one of (1) to (7) above, the first holding portion may include a plurality of first through holes that penetrate the housing in the first direction, and each tip end portion of the plurality of first electric wires may be received in one of the plurality of first through holes. Similarly, the second holding portion may include a plurality of second through holes that penetrate the housing in the first direction, and each tip end portion of the plurality of second electric wires may be received in one of the plurality of second through holes. In this case, the first holding portion that holds the plurality of first electric wires and the second holding portion that holds the plurality of second electric wires can be easily formed. Furthermore, the first holding portion and the second holding portion can stably hold each electric wire.

(9) The electrical connector according to any one of (1) to (8) above may further include a first covering member that covers at least portions of the plurality of first electric wires other than each tip end portion thereof, and the plurality of first electric wires may be integrated by the first covering member. Similarly, the electrical connector may further include a second covering member that covers at least portions of the plurality of second electric wires other than each tip end portion thereof, and the plurality of second electric wires may be integrated by the second covering member. In this case, it is easier to hold the plurality of first electric wires and the plurality of second electric wires in the housing.

Details of Embodiments of the Present Disclosure

A specific example of the electrical connector according to the present embodiment will be described with reference to the drawings as necessary. The present disclosure is not limited to these examples, but is defined by the scope of the claims, and is intended to include meanings equivalent to the scope of the claims and all modifications within the scope. In the following description, the same elements will be denoted by the same reference signs in the description of the drawings, without redundant description.

Figure 2:
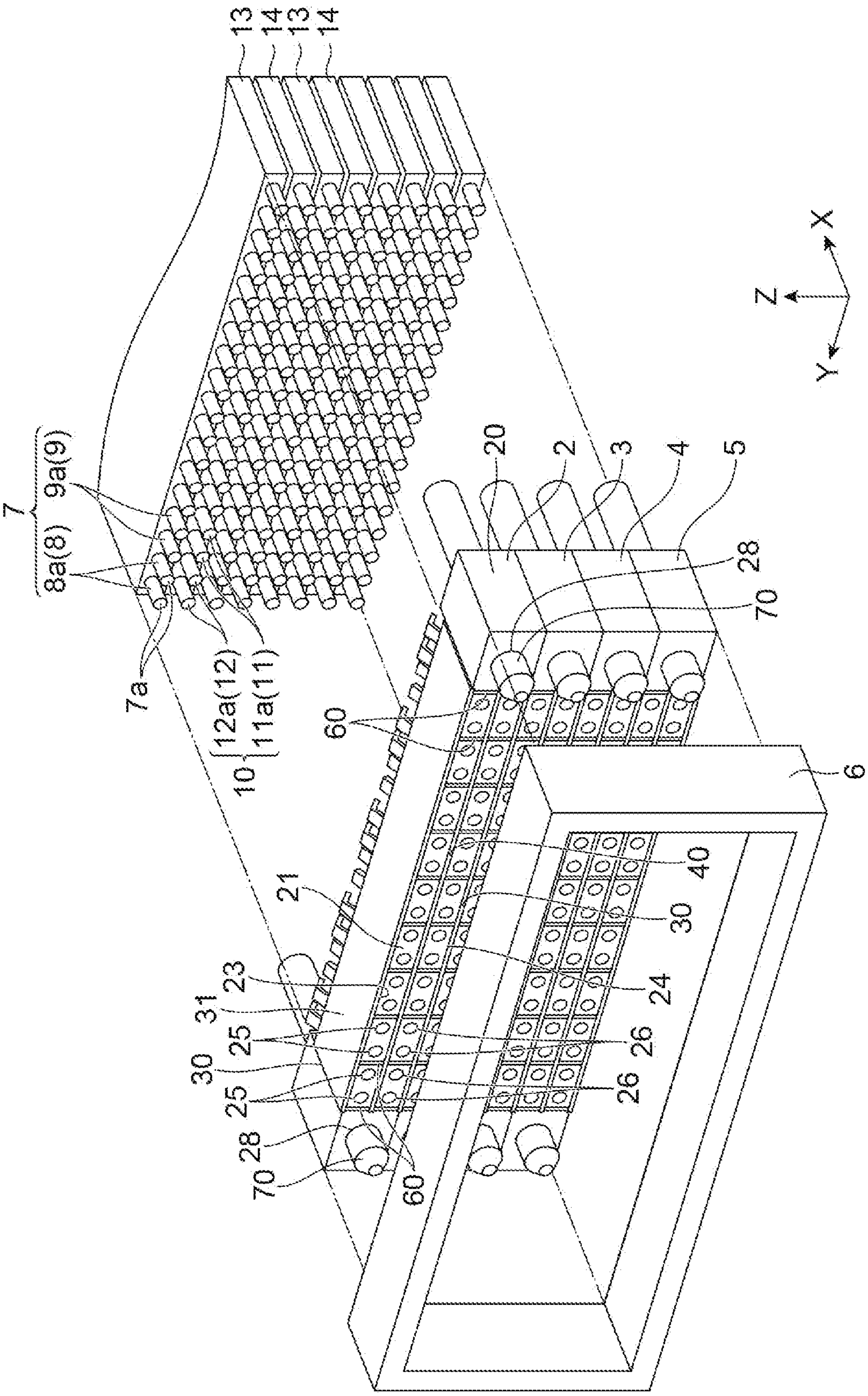
FIG. 2 is an exploded perspective view of the electrical connector shown in FIG. 1.

FIG. 1 is a perspective view showing an electrical connector according to an embodiment. FIG. 2 is an exploded perspective view of the electrical connector shown in FIG. 1. As shown in FIGS. 1 and 2, the electrical connector 1 includes a plurality of sub-connectors 2, 3, 4, and 5 and a frame 6. The electrical connector 1 is attached to a board (not shown) with a mating connector (not shown), for example. The sub-connectors 2 to 5 are stacked in a Z direction (piled up in order) and held by the frame 6. The sub-connectors 3, 4, and 5 have the same configuration as the sub-connector 2. For this reason, hereinafter, the details of the sub-connector 2 will be explained, and the explanation of the sub-connectors 3, 4, and 5 may be omitted.

Figure 3:
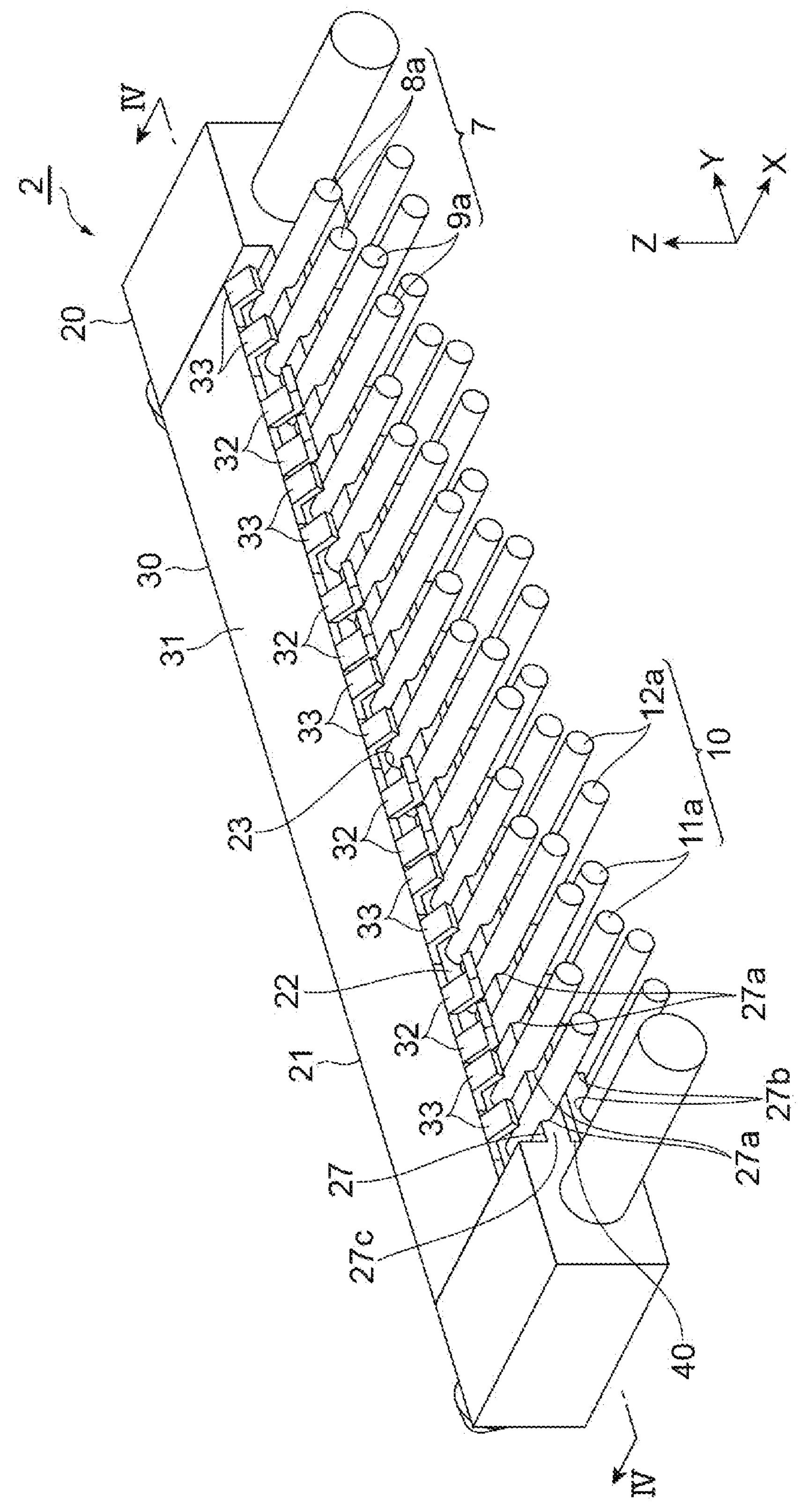
FIG. 3 is a perspective view showing a sub-connector that constitutes the electrical connector shown in FIG. 1.

FIG. 3 is a perspective view showing a sub-connector that constitutes the electrical connector shown in FIG. 1. As shown in FIGS. 1 to 3, the sub-connector 2 includes a plurality of first electric wires 7, a plurality of second electric wires 10, a housing 20, ground plates 30, 40, and 30, a plurality of shield members 60, and a pair of guide pins 70. A ground plate 30 disposed below the sub-connector 2 in the Z direction is a member shared with the sub-connector 3. The plurality of first electric wires 7 are integrated by a covering member 13 to form a flexible flat cable (FFC). Similarly, the plurality of second electric wires 10 are integrated by a covering member 14 to form a flexible flat cable.

The plurality of first electric wires 7 are members for transmitting electric power or electric signals. The plurality of first electric wires 7 include a plurality of signal lines 8 (a plurality of first signal lines) and a plurality of ground lines 9 (a plurality of first ground lines). In one example, the plurality of first electric wires 7 include five pairs of (ten) signal lines 8 and four pairs of (eight) ground lines 9. Each of the signal lines 8 has a conductor 8*a*. The conductor 8*a* is formed from a metal such as copper. When the electrical connector 1 is connected to the mating connector, the conductor 8*a* is connected to a circuit on the board with a terminal provided on the mating connector. The conductor 8*a* may be directly connected to an electrode pad provided on the board. The signal line 8 may be an insulated wire in which the conductor 8*a* is covered with an insulator, or may be a bare wire in which the conductor 8*a* is exposed as it is. Each of the ground lines 9 has a conductor 9*a*. The conductor 9*a* is formed from a metal such as copper. For example, when the electrical connector 1 is connected to the mating connector, the conductor 9*a* is connected to a ground with a ground terminal provided on the mating connector. The conductor 9*a* may be directly connected to an electrode pad provided on the board. The ground line 9 may be an insulated wire in which the conductor 9*a* is covered with an insulator, or may be a bare wire in which the conductor 9*a* is exposed as it is. In a case where the ground line 9 is an insulated wire, a part of the insulator of the insulated wire is removed and the conductor 9*a* is exposed such that an elastic member 32 of the ground plate 30 comes into contact with the conductor 9*a*, as will be described below.

The plurality of first electric wires 7 each extend in an X direction. The plurality of first electric wires 7 are aligned in a Y direction perpendicular to the X direction. In one example, the pair of signal lines 8 and the pair of ground lines 9 are disposed to be alternately aligned (staggered) in the Y direction. The pair of adjacent signal lines 8 carry currents in phases opposite to each other, and transmit signals through differential transmission in which signals are transmitted using a potential difference between the pair of signal lines 8. The distance between the conductors (the distance between centers) of the plurality of first electric wires 7 is, for example, 0.6 mm.

The plurality of second electric wires 10 are members for transmitting electric power or electric signals. The plurality of second electric wires 10 include a plurality of signal lines 11 (a plurality of second signal lines) and a plurality of ground lines 12 (a plurality of second ground lines). In one example, the plurality of second electric wires 10 include four pairs of (eight) signal lines 11 and five pairs of (ten) ground lines 12. Each of the signal lines 11 has a conductor 11*a*. The conductor 11*a* is formed from a metal such as copper. When the electrical connector 1 is connected to the mating connector, the conductor 11*a* is connected to a circuit on the board with a terminal provided on the mating connector. The conductor 11*a* may be directly connected to an electrode pad provided on the board. The signal line 11 may be an insulated wire in which the conductor 11*a* is covered with an insulator, or may be a bare wire in which the conductor 11*a* is exposed as it is. Each of the ground lines 12 has a conductor 12*a*. The conductor 12*a* is formed from a metal such as copper. When the electrical connector 1 is connected to the mating connector, the conductor 12*a* is connected to a ground with a ground terminal provided on the mating connector. The conductor 12*a* may be directly connected to an electrode pad provided on the board. The ground line 12 may be an insulated wire in which the conductor 12*a* is covered with an insulator, or may be a bare wire in which the conductor 12*a* is exposed as it is. In a case where the ground line 12 is an insulated wire, a part of the insulator of the insulated wire is removed and the conductor 12*a* is exposed such that the elastic member 32 of the ground plate 30 comes into contact with the conductor 12*a* (see FIG. 6), as will be described below.

The plurality of second electric wires 10 each extend in the X direction. The plurality of second electric wires 10 are aligned in the Y direction. The plurality of second electric wires 10 are aligned with the plurality of first electric wires 7 in a Z direction perpendicular to both the X direction and the Y direction. That is, the plurality of second electric wires 10 are located below the plurality of first electric wires 7 in the Z direction. In one example, a pair (two) of signal lines 11 and a pair (two) of ground lines 12 are alternately aligned (staggered) in the Y direction. The pair of adjacent signal lines 11 carry currents in phases opposite to each other, and transmit signals through differential transmission in which signals are transmitted using a potential difference between the pair of signal lines 11. The distance between the conductors of the plurality of second electric wires 10 is, for example, 0.6 mm.

The pair of signal lines 11 are aligned with the pair of ground lines 9 in the Z direction. The pair of ground lines 12 are aligned with the pair of signal lines 8 in the Z direction. That is, in the sub-connector 2, in the Y direction, the pair of ground lines 9 and the pair of ground lines 12 are disposed in an staggered manner (in a zigzag pattern), and the pair of signal lines 8 and the pair of signal lines 11 are disposed in an staggered manner different from the arrangement of the pairs of ground lines 9 and 12. Further, in the plurality of first electric wires 7, the pair of signal lines 8 and the pair of ground lines 9 are disposed in an alternate manner in the Y direction. Similarly, in the plurality of second electric wires 10, the pair of signal lines 11 and the pair of ground lines 12 are disposed in an alternate manner in the Y direction.

The covering member 13 is a member that covers the portions of the plurality of first electric wires 7 other than the tip end portions and the rear end portions thereof. The material of the covering member 13 is a resin such as polyester. A portion of the covering member 13 that covers the tip end portions of the conductors 8*a* of the signal lines 8 and the tip end portions of the conductors 9*a* of the ground lines 9 has been removed. That is, a part of each of the conductors 8*a* of the signal lines 8 and a part of each of the conductors 9*a* of the ground lines 9 are exposed from the covering member 13.

The covering member 14 is a member that covers the portions of the plurality of second electric wires 10 other than the tip end portions and the rear end portions thereof. The material of the covering member 14 is a resin such as polyester. A portion of the covering member 14 that covers the tip end portions of the conductors 11*a* of the signal lines 11 and the tip end portions of the conductors 12*a* of the ground lines 12 has been removed. That is, the tip end portions of the conductors 11*a* of the signal lines 11 and the tip end portions of the conductors 12*a* of the ground lines 12 are exposed from the covering member 14.

The housing 20 is a rectangular parallelepiped-shaped member that holds the plurality of first electric wires 7 and the plurality of second electric wires 10. The material of the housing 20 is a resin such as polyphenylene sulfide (PPS). The housing 20 has a first surface 21, a second surface 22, a third surface 23, and a fourth surface 24. The first surface 21 is a surface that faces a connection surface of the mating connector when the electrical connector 1 is connected to the mating connector. The first surface 21 and the second surface 22 are surfaces extending in the Y direction and the Z direction. The second surface 22 is located on a side opposite to the first surface 21 in the X direction. The third surface 23 and the fourth surface 24 are surfaces extending in the X direction and the Y direction. The fourth surface 24 is located on a side opposite to the third surface 23 in the Z direction.

The housing 20 further includes a plurality of first through holes 25 (a first holding portion), a plurality of second through holes 26 (a second holding portion), a step 27, and a pair of guide holes 28.

The first through hole 25 is a hole that penetrates the housing 20 in the X direction. The first through hole 25 is open on the first surface 21 and the second surface 22. The shape of the first through hole 25 when viewed in the X direction is, for example, a circular shape. In the present embodiment, eighteen first through holes 25 are formed in the housing 20. The plurality of first through holes 25 are aligned in the Y direction. The inner diameter of each of the first through holes 25 is the same as or slightly larger than the outer diameter of the conductor 8*a* of the signal line 8 and the outer diameter of the conductor 9*a* of the ground line 9. Either the conductor 8*a* of the signal line 8 or the conductor 9*a* of the ground line 9 is disposed inside each first through hole 25. That is, each first through hole 25 holds the conductor at the tip end portion of the first electric wire 7. Each tip end 7*a* of the plurality of first electric wires 7 is exposed from each of the plurality of first through holes 25 on the first surface 21.

The second through hole 26 is a hole that penetrates the housing 20 in the X direction. The second through hole 26 is open on the first surface 21 and the second surface 22. The shape of the second through hole 26 when viewed in the X direction is, for example, a circular shape. In the present embodiment, eighteen second through holes 26 are formed in the housing 20. The plurality of second through holes 26 are aligned in the Y direction. The plurality of second through holes 26 are aligned with the plurality of first through holes 25 in the Z direction. The inner diameter of each of the second through holes 26 is the same as or slightly larger than the outer diameter of the conductor 11*a* of the signal line 11 and the outer diameter of the conductor 12*a* of the ground line 12. Either the conductor 11*a* of the signal line 11 or the conductor 12*a* of the ground line 12 is disposed inside each second through hole 26. That is, each second through hole 26 holds the conductor at the tip end portion of the second electric wire 10. Each tip end 10*a* of the plurality of second electric wires 10 is exposed from each of the plurality of second through holes 26 on the first surface 21.

The step 27 is provided on the second surface 22, as shown in FIG. 3. The shape of the step 27 is a rectangular parallelepiped. The step 27 protrudes from the second surface 22 in the X direction. The step 27 is located between the plurality of first electric wires 7 and the plurality of second electric wires 10 in the Z direction. A plurality of first grooves 27*a* are formed in the front surface of the step 27, and a plurality of second grooves 27*b* are formed in the back surface of the step 27.

The first groove 27*a* extends in the X direction. The first groove 27*a* is open at an end surface 27*c* of the step 27, which is located on a side opposite to the second surface 22 along the X direction. The shape of the first groove 27*a* when viewed in the X direction is, for example, a semicircular shape, but may be a V shape. In the present embodiment, eighteen first grooves 27*a* are formed in the step 27. The plurality of first grooves 27*a* are aligned in the Y direction. Each first grooves 27*a* communicates with each first through hole 25. The inner diameter of each first groove 27*a* is the same as the inner diameter of the first through hole 25. Either the conductor 8*a* of the signal line 8 or the conductor 9*a* of the ground line 9 is disposed inside each first groove 27*a*. Each conductor at the tip end portion of the first electric wire 7 is in contact with each first groove 27*a*.

The second groove 27*b* extends in the X direction. The second groove 27*b* is open at the end surface 27*c* of the step 27. The second groove 27*b* is located on a side opposite to the first groove 27*a* in the Z direction. The shape of the second groove 27*b* when viewed in the X direction is, for example, a semicircular shape in a direction opposite to the first groove 27*a*, but may be a V shape in the direction opposite thereto. In the present embodiment, eighteen second grooves 27*b* are formed in the step 27. The plurality of second grooves 27*b* are aligned in the Y direction. Each second grooves 27*b* communicates with each second through hole 26. The inner diameter of each second groove 27*b* is the same as the inner diameter of the second through hole 26. Either the conductor 11*a* of the signal line 11 or the conductor 12*a* of the ground line 12 is disposed inside each second groove 27*b*. Each conductor of the second electric wire 10 is in contact with each second groove 27*b*.

The covering member 13 is removed, for example, at a position where it overlaps the end surface 27*c* of the step 27 in the X direction. That is, the position of the front end surface (not shown) of the covering member 13 in the X direction is approximately the same as the position of the end surface 27*c* of the step 27 in the X direction. In a case where the first electric wire 7 is an insulated wire, the insulator is removed at the same position, and the conductors of the first electric wires 7 (the conductor 8*a* of the signal line 8 and the conductor 9*a* of the ground line 9) are exposed. The covering member 14 is removed, for example, at a position where it overlaps the end surface 27*c* of the step 27 in the X direction. That is, the position of the front end surface (not shown) of the covering member 14 in the X direction is approximately the same as the position of the end surface 27*c* of the step 27 in the X direction. In a case where the second electric wire 10 is an insulated wire, the insulator is removed at the same position, and the conductors of the second electric wires 10 (the conductor 11*a* of the signal line 11 and the conductor 12*a* of the ground line 12) are exposed.

The pair of guide holes 28 are holes that penetrate the housing 20 in the X direction. The shape of the guide hole 28 when viewed in the X direction is circular. The pair of guide pins 70 are inserted inside the pair of guide holes 28, respectively. The pair of guide holes 28 are formed such that the plurality of first through holes 25 and second through holes 26 are sandwiched therebetween in the Y direction. The inner diameter of each of the pair of guide holes 28 is larger than the inner diameter of each first through hole 25 and the inner diameter of each second through hole 26.

The ground plate 30 is a ground member for reducing noise generated in the electrical connector 1. The material of the ground plate 30 is a conductive material formed of an alloy such as beryllium copper. As shown in FIG. 3, the ground plate 30 has a plate main body 31, a plurality of elastic members 32 (a first connector, a first elastic piece), and a plurality of elastic members 33 (a second connector, a second elastic piece). Although FIG. 3 shows the ground plate 30 located above the housing 20, a ground plate 30 including a similar configuration is also disposed below the housing 20. The plate main body 31, the plurality of elastic members 32, and the plurality of elastic members 33 are integrally formed by, for example, press working.

The plate main body 31 is provided on the third surface 23 (or the fourth surface 24) of the housing 20. The plate main body 31 is fixed to the third surface 23 (or the fourth surface 24) by, for example, an adhesive. The plate main body 31 is a flat plate that is elongated in the Y direction, and is located above the plurality of first through holes 25. The plate main body 31 may be fixed to the third surface 23 of the housing 20 using a mechanical engagement means.

The number of the plurality of elastic members 32 is the same as the number of the plurality of ground lines 9 or the plurality of signal lines 11, which is four pairs (eight). The number of the plurality of elastic members 33 is the same as the number of the plurality of signal lines 8 or the plurality of ground lines 12, which is five pairs (ten). The plurality of elastic members 32 and the plurality of elastic members 33 are aligned in the Y direction. A pair of elastic members 32 and a pair of elastic members 33 are alternately aligned in the Y direction. The plurality of elastic members 32 are aligned with the plurality of ground lines 9 or the plurality of signal lines 11 in the Z direction, and the plurality of elastic members 33 are aligned with the plurality of signal lines 8 or the plurality of ground lines 12 in the Z direction.

Figure 4:
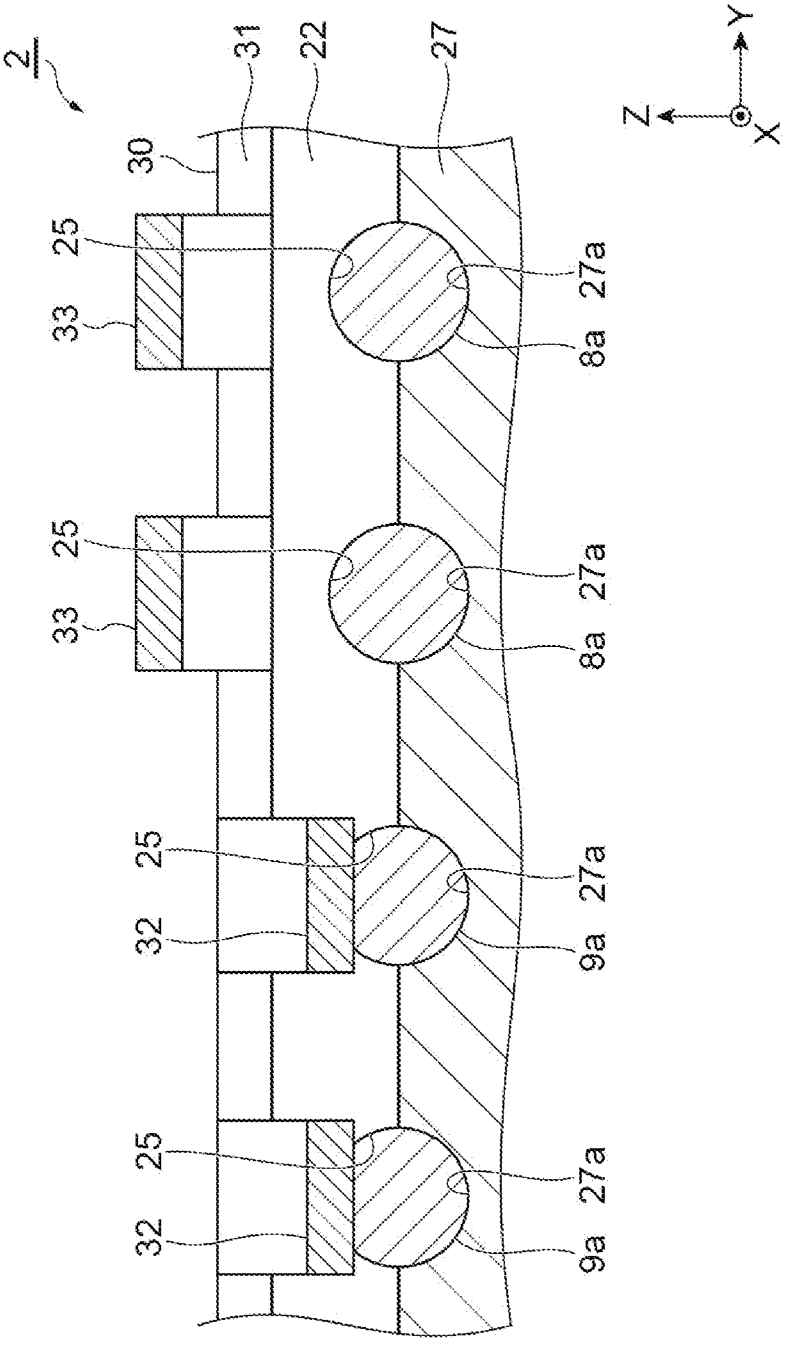
FIG. 4 is an enlarged cross-sectional view of a part of the sub-connector shown in FIG. 3 along line IV-IV.

Here, the details of the elastic member 32 and the elastic member 33 will be explained with reference to FIG. 4 as well. FIG. 4 is an enlarged cross-sectional view of a part of the sub-connector 2 shown in FIG. 3 along line IV-IV. Each elastic member 32 is a member for electrically connecting the plate main body 31 and the conductor 9*a* of each ground line 9 to each other. Each elastic member 32 extends from the plate main body 31 toward the conductor 9*a* of each ground line 9, and is bent to be folded back at a portion where it comes into contact with the conductor 9*a*. The shape of the elastic member 32 when viewed in the Y direction is a V shape that protrudes toward the conductor 9*a* of each ground line 9. Each elastic member 32 has elasticity and is in elastic contact with the conductor 9*a*. The elastic member 32 faces the first groove 27*a* of the step 27 such that the conductor 9*a* is sandwiched therebetween. In other words, the step 27 faces the elastic member 32 with the conductor 9*a* sandwiched therebetween. The elastic member 32 is in contact with the conductor 9*a* on the first groove 27*a*.

Each elastic member 33 is a member for electrically connecting the plate main body 31 and a conductor of a ground line of another sub-connector (the sub-connector 3 in the case of the lower ground plate 30) disposed on the plate main body 31 to each other. Details will be described below. Each elastic member 33 extends from the plate main body 31 toward a side opposite to the conductor 8*a* of each signal line 8 (for example, toward the ground line 12 of the sub-connector 3), and is bent to be folded back in the middle. The shape of the elastic member 33 when viewed in the Y direction is a V shape in a direction opposite to the elastic member 32. Each elastic member 33 has elasticity. Each elastic member 33 is configured not to come into contact with the conductor 8*a* of each signal line 8. The elastic member 33 faces the first groove 27*a* of the step 27 with the conductor 8*a* sandwiched therebetween. In other words, the step 27 faces the elastic member 33 with the conductor 8*a* sandwiched therebetween.

Returning to FIGS. 1 and 2, the ground plate 40 (a second ground plate) is another ground member for reducing the noise generated in the electrical connector 1. The material of the ground plate 40 is an alloy such as beryllium copper. The ground plate 40 is a flat plate that is elongated in the Y direction. The ground plate 40 is located in a through hole (not shown) that penetrates the housing 20 in the X direction. The ground plate 40 is located between the plurality of first electric wires 7 and the plurality of second electric wires 10. A part of the ground plate 40 is located inside the step 27 and is located between the plurality of first grooves 27*a* and the plurality of second grooves 27*b*. The ground plate 40 is larger than the plate main body 31 of the ground plate 30 by the step 27. Like the ground plate 30, the ground plate 40 may have elastic members, and the elastic members may be in elastic contact with the conductors 9*a* of the ground lines 9 or the conductors 12*a* of the ground lines 12. Alternatively, the elastic members may be configured to come into contact with the ground plate 30. Alternatively, the elastic members may be configured to come into contact with the guide pin 70. In this case, the material of the guide pin 70 is a metal, and the guide pin 70 comes into contact with a ground or the like closed to the board. The ground plate 40 does not need to be connected to the ground.

The plurality of shield members 60 is a member for reducing the noise generated in the electrical connector 1. The material of the shield member 60 is an alloy such as beryllium copper. Each shield member 60 is located outside the plurality of first electric wires 7 in the Y direction, outside the plurality of second electric wires 10 in the Y direction, between the signal line 8 and the ground line 9 adjacent to each other, and between the signal line 11 and the ground line 12 adjacent to each other. The shield member 60 may be connected to the ground. The end portion of the shield member 60 may be formed into a spring shape, and the end portion may be in contact with the ground plate 30 or the ground plate 40. The shield member 60 does not need to be connected to the ground.

The pair of guide pins 70 are pins extending in the X direction. The material of the guide pin 70 is a metal such as stainless steel. Each guide pin 70 is located within each guide hole 28. The pair of guide pins 70 are provided such that the plurality of first through holes 25 and second through holes 26 are sandwiched therebetween in the Y direction. When the sub-connector 2 is fitted to the mating connector, the positioning of the signal lines and the like is performed by inserting the pair of guide pins 70 into a pair of guide holes (not shown) provided in the mating connector.

The sub-connector 2 configured as described above and the sub-connectors 3 to 5 each including the same configuration as the sub-connector 2 are stacked in the Z direction and held by the frame 6. The frame 6 is an annular member. The material of the frame 6 is a resin such as polyphenylene sulfide (PPS), polybutylene terephthalate (PBT), or acrylonitrile butadiene styrene (ABS). The stacked sub-connectors 2 to 5 are located inside the frame 6. The frame 6 is in contact with the plate main body 31 of the ground plate 30. The ground plate 30 is held by the frame 6 and the third surface 23 of the housing 20.

Figure 5:
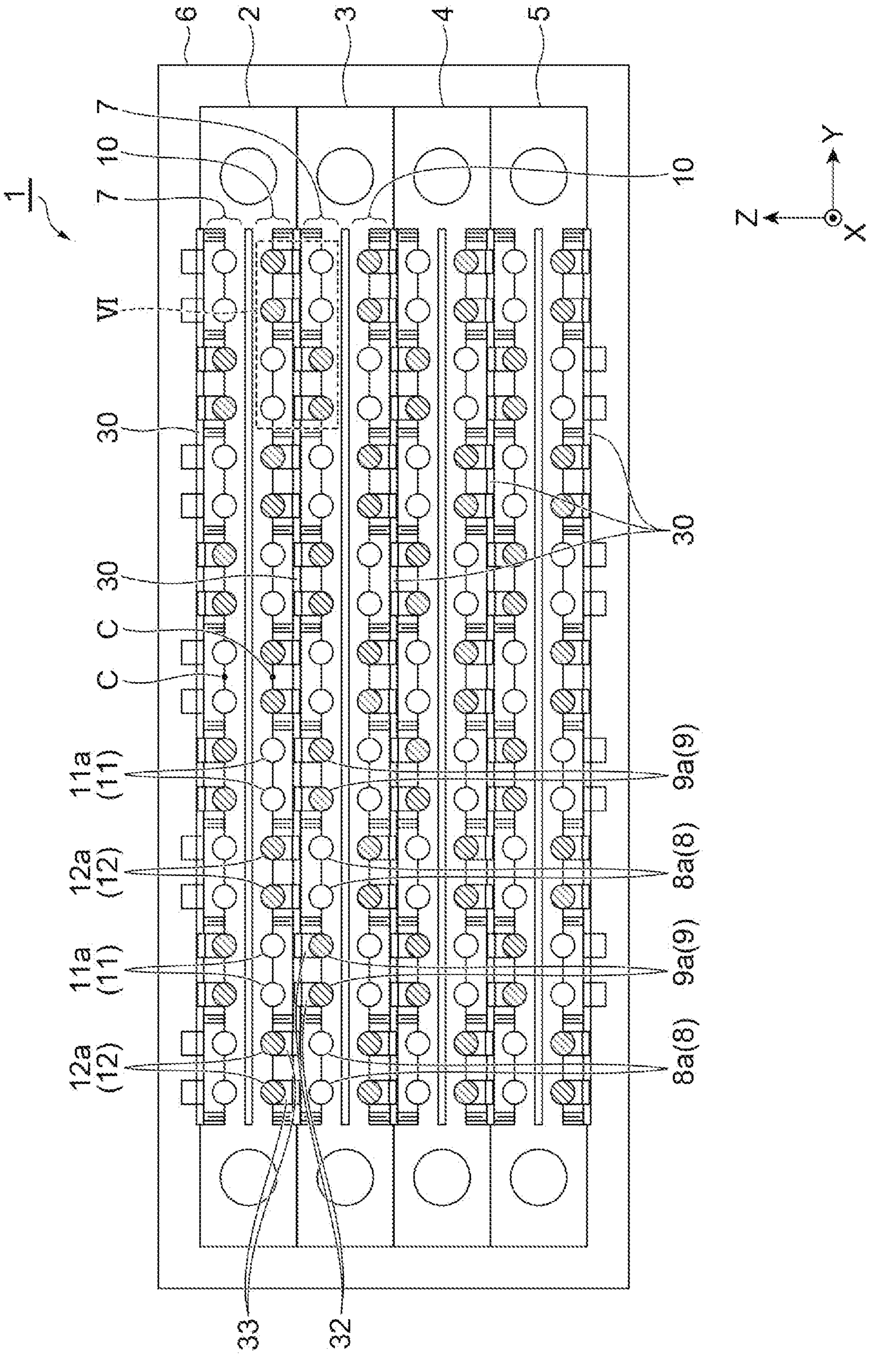
FIG. 5 is a rear view of the electrical connector shown in FIG. 1.
Figure 6:
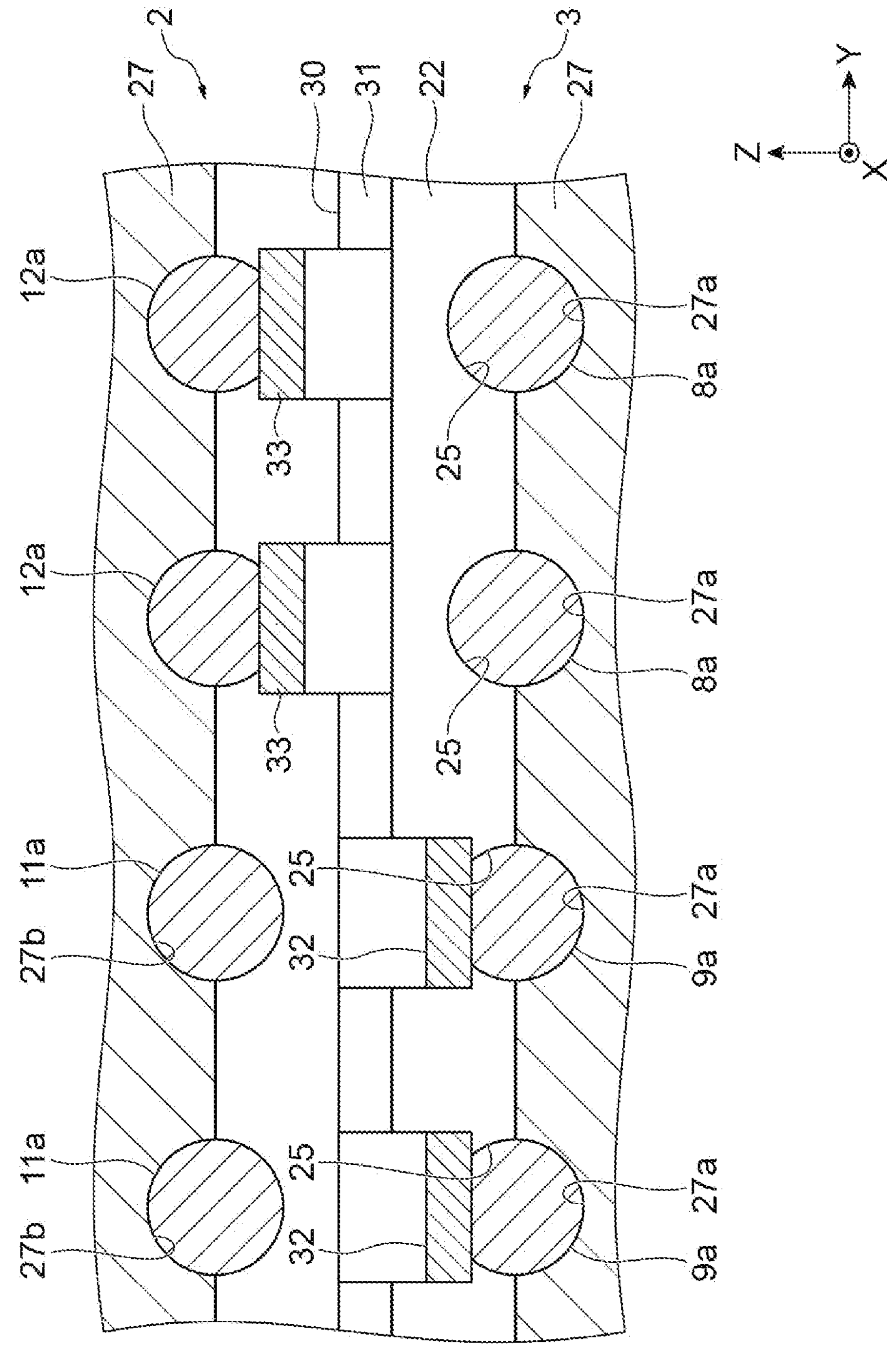
FIG. 6 is an enlarged view of a part VI of the electrical connector shown in FIG. 5.

Here, with reference to FIGS. 5 and 6, a connection configuration between the ground plate 30 disposed between the sub-connector 2 and the sub-connector 3 and the plurality of first electric wires 7 of the sub-connector 3 and the plurality of second electric wires 10 of the sub-connector 2 will be described.

First, with reference to FIG. 5, the arrangement of electric wires in the sub-connector 2 and the sub-connector 3 will be described. The plurality of ground lines 9 and the plurality of ground lines 12 in the plurality of first electric wires 7 and the plurality of second electric wires 10 in the sub-connectors 2 and 3 are disposed in a staggered manner in the Y direction. Further, the plurality of signal lines 8 and the plurality of signal lines 11 in the plurality of first electric wires 7 and the plurality of second electric wires 10 in the sub-connectors 2 and 3 are also disposed in a staggered manner in the Y direction. Further, in the plurality of first electric wires 7 in the sub-connectors 2 and 3, each signal line of the plurality of signal lines 8 and each ground line of the plurality of ground lines 9 may be disposed to be point symmetrical with respect to the center point C in the Y direction. Further, in the plurality of second electric wires 10 in the sub-connectors 2 and 3, each signal line of the plurality of signal lines 11 and each ground line of the plurality of ground lines 12 may be disposed to be point symmetrical with respect to the center point C in the Y direction. In the plurality of first electric wires 7 and the plurality of second electric wires 10 in the other sub-connectors 4 and 5, the plurality of ground lines 9 and the plurality of ground lines 12 are also disposed in a staggered manner similarly and may be disposed to be point symmetrical with respect to the center point.

Next, with reference to FIG. 6, a connection configuration between the ground plate 30 located between the two sub-connectors 2 and 3 and the signal line and the ground line located on one side and the other side of the ground plate 30 will be described. As shown in FIG. 6, the elastic member 33 of the shared ground plate 30 is connected to the conductor 12*a* of each of the ground lines 12 in the second electric wires 10 of the sub-connector 2. On the other hand, the elastic member 32 of the ground plate 30 located between the two sub-connectors 2 and 3 is connected to the conductor 9*a* of each of the ground lines 9 in the first electric wires 7 of the sub-connector 3. In this way, the ground plate 30 located between the two sub-connectors 2 and 3 is shared. By sharing the ground plate 30 in this way, the ground lines 9 of the sub-connector 3 and the ground lines 12 of the sub-connector 2 share a potential (have the same potential).

As described above, in the electrical connector 1 according to the present embodiment, the ground plate 30 is disposed between the plurality of ground lines 9 of the sub-connector 3 and the plurality of ground lines 12 of the sub-connector 2, and this ground plate 30 is connected to each conductor 9*a* of the plurality of ground lines 9 and each conductor 12*a* of the plurality of ground lines 12. The ground lines 9 of the sub-connector 3 and the ground lines 12 of the sub-connector 2 share a ground potential through the ground plate 30 connected to both of the ground lines in this way. As a result, it is possible to reduce the noise generated in the electrical connector 1 so as to improve transmission characteristics. Furthermore, in the electrical connector 1, the ground plate 30 connected to the plurality of ground lines 9 and the plurality of ground lines 12 is disposed between the plurality of first electric wires 7 and the plurality of second electric wires 10 and is used as a common ground plate. Because the ground plate is shared in this way, the electrical connector 1 can be made smaller and thinner. Therefore, according to the electrical connector 1, in addition to being able to improve the transmission characteristics, it is also possible to make the electrical connector 1 smaller and thinner. The above-described configuration is also applied to the connection configuration between the sub-connectors 3 and 4 and the connection configuration between the sub-connectors 4 and 5, and it is possible to improve the transmission characteristics and miniaturize in these as well.

In the electrical connector 1 according to the present embodiment, the plurality of ground lines 9 and the plurality of ground lines 12 are disposed in a staggered manner in the Y direction in each of the sub-connectors 2 to 5. As a result, the configuration for connecting the common ground plate 30 to the plurality of ground lines 9 and the plurality of ground lines 12 (the first connector and the second connector) can be simplified.

In the electrical connector 1 according to the present embodiment, in the plurality of first electric wires 7, each signal line of the plurality of signal lines 8 and each ground line of the plurality of ground lines 9 are disposed to be point symmetrical with respect to the center point C in the Y direction. Symmetrical, in the plurality of second electric wires 10, each signal line of the plurality of signal lines 11 and each ground line of the plurality of ground lines 12 are disposed to be point symmetrical with respect to the center point C in the Y direction. As a result, it is possible to prevent the plurality of first electric wires 7 and the plurality of second electric wires 10 from being assembled in an incorrect direction when the plurality of first electric wires 7 and the plurality of second electric wires 10 are assembled.

In the electrical connector 1 according to the present embodiment, the elastic member 32 is an elastic piece configured to come into elastic contact with each of the conductors 9*a* of the plurality of ground lines 9, and the elastic member 33 is an elastic piece configured to come into elastic contact with each of the conductors 12*a* of the plurality of ground lines 12. With this configuration, each ground plate 30 can be brought into reliable contact with each ground line 9 and each ground line 12, and stable ground performance can be achieved.

In the electrical connector 1 according to the present embodiment, the elastic piece of the elastic member 32 and the elastic piece of the elastic member 33 are formed to protrude in different directions from each other in the Z direction. As a result, the ground plate 30 can be brought into reliable contact with each ground line 9 and each ground line 12, and stable ground performance can be achieved.

The electrical connector 1 according to the present embodiment further includes the covering member 13 that covers the portions of the plurality of first electric wires 7 other than the tip end portions thereof, and the plurality of first electric wires 7 are integrated by the covering member 13. Similarly, the electrical connector 1 according to the present embodiment further includes the covering member 14 that covers the portions of the plurality of second electric wires 10 other than the tip end portions thereof, and the plurality of second electric wires 10 are integrated by the covering member 14. As a result, in the electrical connector 1, it is easier to hold the plurality of first electric wires 7 and the plurality of second electric wires 10 in the housing 20.

Although the embodiment of the present disclosure is described in detail above, the present disclosure is not limited to the above embodiment and can be applied to various embodiments. For example, in the above embodiment, the holding portions that hold the first electric wires 7 and the second electric wires 10 are through holes, but the holding portions may have other shapes as long as they can hold the first electric wires 7 and the second electric wires 10, and the holding portions may be, for example, grooves. Further, in the above embodiment, the elastic members 32 and 33 have a V shape, but the elastic members 32 and 33 may have other shapes. As an example, the shape of the elastic members 32 and 33 may be a smooth curve shape that protrudes toward the conductor of the ground line, or may be a straight line shape.

In the above embodiment, the first electric wires 7 and the second electric wires 10 are disposed to be point-symmetrical with respect to the center point C, but the present invention is not limited to this, and the electric wires may be disposed to be asymmetrical. However, in this case, in order to prevent the first electric wires 7 and the second electric wires 10 or the ground plate from being incorrectly assembled, the ground plate 30 may be provided with a configuration for positioning at least one of the plurality of first electric wires 7 and the plurality of second electric wires 10 (for example, a notch or the like). In this case, it is possible to prevent the ground plate from being assembled in an incorrect direction when the ground plate is assembled. Such a positioning configuration may be provided in a case where the first electric wires 7 and the second electric wires 10 are disposed to be point symmetrical.

In the above embodiment, in the first electric wires 7 and the second electric wires 10, the signal lines 8 and 11 and the ground lines 9 and 12 are configured as a pair, but the arrangement configuration is not limited to this. For example, in the first electric wires 7 and the second electric wires 10, each of the signal lines 8, 11 and the ground lines 9, 12 may be disposed alternately one by one, or three or more lines of the same type may be disposed as one group and each group may be disposed alternately. In this case, the arrangement configuration of the elastic members 32 and 33 can be changed depending on the arrangement configuration of the ground lines. Since such changes are obvious to those skilled in the art, their explanation will be omitted.

What is claimed is:

1. An electrical connector comprising:

a plurality of first electric wires including a plurality of first signal lines and a plurality of first ground lines connected to a ground, wherein each of the plurality of first electric wires extends in a first direction, and the plurality of first ground lines are arranged in a second direction intersecting with the first direction;

a plurality of second electric wires including a plurality of second signal lines and a plurality of second ground lines connected to a ground, wherein each of the plurality of second electric wires extends in the first direction, and the plurality of second electric wires are arranged in the second direction, the plurality of second electric wires being located in a third direction intersecting with both the first direction and second direction with respect to the plurality of first electric wires;

a housing including a first holding portion that holds each tip end portion of the plurality of first electric wires and a second holding portion that holds each tip end portion of the plurality of second electric wires; and a ground plate including a plate main body placed between the plurality of first electric wires and the plurality of second electric wires, wherein the first holding portion holds each conductor at each tip end portion of the plurality of first electric wires, wherein the second holding portion holds each conductor at each tip end portion of the plurality of second electric wires, and wherein the ground plate includes a first connector extending toward and connected to each conductor of the plurality of first ground lines from the plate main body, and a second connector extending toward and connected to each conductor of the plurality of second ground lines from the plate main body.

2. The electrical connector according to claim 1, wherein the plurality of first ground lines and the plurality of second ground lines are disposed in a staggered manner in the second direction.

3. The electrical connector according to claim 1, wherein each first signal line of the plurality of first signal lines and each first ground line of the plurality of first ground lines are disposed in a staggered manner in the second direction.

4. The electrical connector according to claim 1, wherein, in the plurality of first electric wires, each signal line of the plurality of first signal lines and each ground line of the plurality of first ground lines are disposed to be point symmetrical with respect to a center point in the second direction, and wherein, in the plurality of second electric wires, each signal line of the plurality of second signal lines and each ground line of the plurality of second ground lines are disposed to be point symmetrical with respect to a center point in the second direction.

5. The electrical connector according to claim 1, wherein the first connector includes a plurality of first elastic pieces configured to come into elastic contact with each conductor of the plurality of first ground lines, and wherein the second connector includes a plurality of second elastic pieces configured to come into elastic contact with each conductor of the plurality of second ground lines.

6. The electrical connector according to claim 5, wherein the plurality of first elastic pieces and the plurality of second elastic pieces are formed such that each of the plurality of first elastic pieces and each of the plurality of second elastic pieces protrude in different directions from each other in the third direction.

7. The electrical connector according to claim 1, wherein the ground plate is provided with a configuration to position at least one of the plurality of first electric wires and the plurality of second electric wires.

8. The electrical connector according to claim 1, wherein the first holding portion includes a plurality of first through holes that penetrate the housing in the first direction, and each tip end portion of the plurality of first electric wires is received in one of the plurality of first through holes, and wherein the second holding portion includes a plurality of second through holes that penetrate the housing in the first direction, and each tip end portion of the plurality of second electric wires is received in one of the plurality of second through holes.

9. The electrical connector according to claim 1, wherein the electrical connector further comprises a first covering member that covers at least portions of the plurality of first electric wires other than each tip end portion thereof, and the plurality of first electric wires are integrated by the first covering member, and wherein the electrical connector further comprises a second covering member that covers at least portions of the plurality of second electric wires other than each tip end portion thereof, and the plurality of second electric wires are integrated by the second covering member.

* * * * *